United States Patent
Nishi

(10) Patent No.: US 9,715,152 B2
(45) Date of Patent: Jul. 25, 2017

(54) DISPLAY DEVICE AND ELECTRONIC APPARATUS

(75) Inventor: Shota Nishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 102 days.

(21) Appl. No.: 13/414,360

(22) Filed: Mar. 7, 2012

(65) Prior Publication Data

US 2012/0257361 A1     Oct. 11, 2012

(30) Foreign Application Priority Data

Apr. 6, 2011 (JP) ................................ 2011-084730

(51) Int. Cl.
*H05K 1/00* (2006.01)
*G02F 1/1345* (2006.01)

(52) U.S. Cl.
CPC ...... *G02F 1/13452* (2013.01); *G02F 2201/42* (2013.01)

(58) Field of Classification Search
CPC ... G02F 1/13452; G02F 2201/42; H05K 1/11; H05K 1/115; H05K 1/112; H05K 1/14; H05K 1/141; H05K 1/142; H05K 1/147; H05K 1/144; H05K 3/4038; H05K 3/42
USPC .......................... 174/250, 255-258, 261-262
See application file for complete search history.

(56) References Cited

U.S. PATENT DOCUMENTS

| | | | |
|---|---|---|---|
| 2003/0227584 A1* | 12/2003 | Onozuka | G02F 1/136286 349/61 |
| 2005/0001309 A1* | 1/2005 | Tanaka | H01L 23/49816 257/700 |
| 2007/0161228 A1* | 7/2007 | Nakamura et al. | 438/622 |
| 2008/0010871 A1* | 1/2008 | Holmes et al. | 40/1 |
| 2008/0225190 A1* | 9/2008 | Chen | H01L 27/1255 349/38 |
| 2009/0014207 A1* | 1/2009 | Takahashi | 174/266 |
| 2011/0120755 A1* | 5/2011 | Lee et al. | 174/254 |
| 2011/0176199 A1* | 7/2011 | Sakurai et al. | 359/296 |
| 2011/0298835 A1* | 12/2011 | Machida | G09G 3/344 345/690 |
| 2012/0024583 A1* | 2/2012 | Lee et al. | 174/260 |

FOREIGN PATENT DOCUMENTS

JP     2009-115686     5/2009

* cited by examiner

*Primary Examiner* — Tremesha S Willis
(74) *Attorney, Agent, or Firm* — Chip Law Group

(57) ABSTRACT

Disclosed herein is a display device including: a display substrate having wires on a particular one of the surfaces of the display substrate, and having penetration holes each provided at a position exposed to the wire and penetrating the display substrate from the particular surface to the other display-substrate surface; and a wiring substrate provided on the side of the other surface of the display substrate and electrically connected to the wires through the penetration holes.

13 Claims, 12 Drawing Sheets

F I G . 4
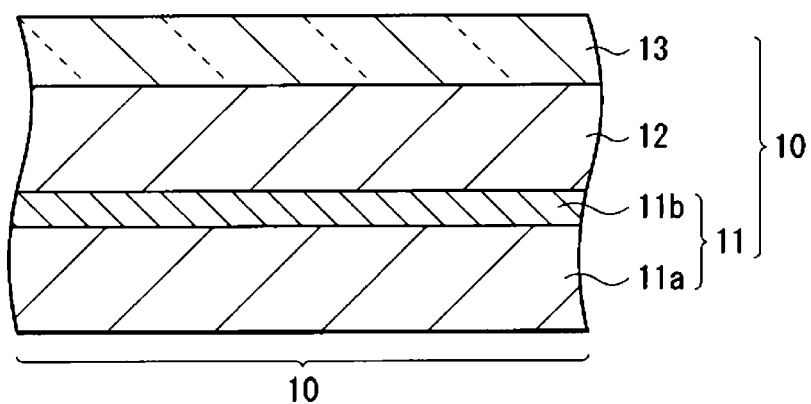

Background Art

Background Art

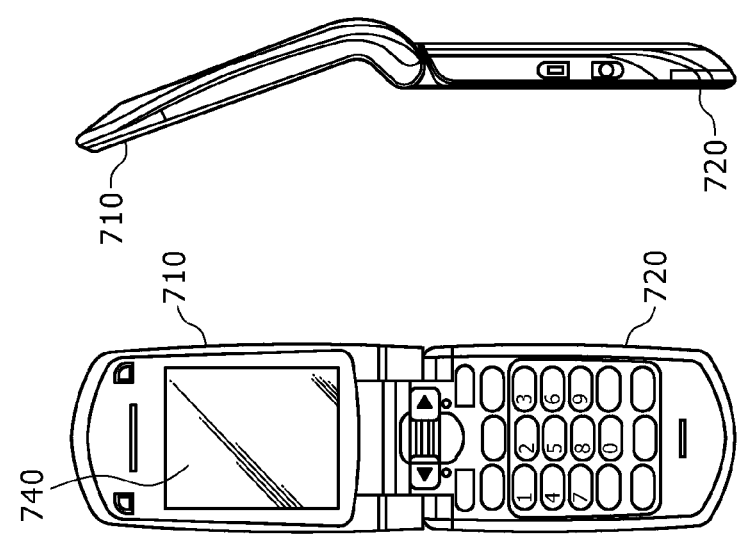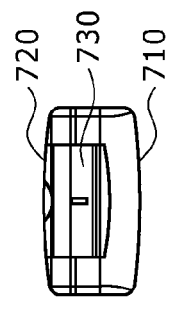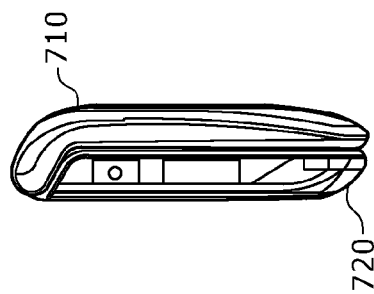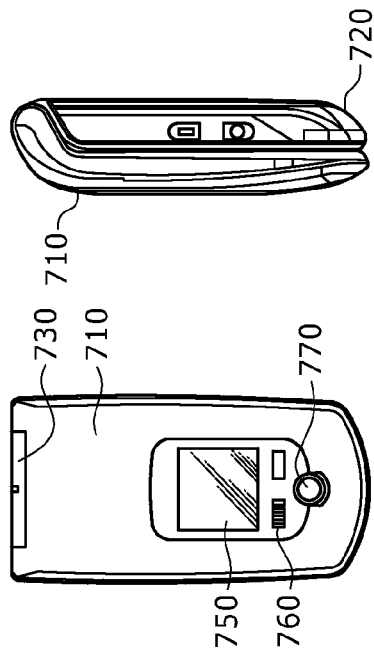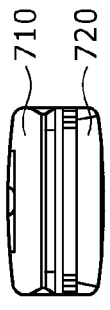

DISPLAY DEVICE AND ELECTRONIC APPARATUS

BACKGROUND

The present disclosure relates to a display device having an external connection wiring substrate connected to a display panel, and relates to electronic apparatuses each employing the apparatus.

In a planar display device such as a liquid-crystal display device or an electrophoretic migration display device, terminals for external connections are provided in the surroundings of a display area to serve as terminals for receiving signals from external sources and supplying the signals to a display panel, and a wiring substrate is connected to the terminals. The surroundings of the display area are a non-display area (refer to, for example, Japanese Patent Laid-open No. 2009-115686, hereinafter referred to as Patent Document 1).

At the present day, the display device is required more and more to have a reduced thickness and narrow display-area edges. In order to meet these requirements, a flexible wiring substrate is used by adoption of a method in accordance with which the wiring substrate is bent along the external shape of a display panel and accommodated in a case.

SUMMARY

If the flexible wiring substrate is bent, however, a curvature distance (or a curvature-radius distance) of the wiring substrate is required. Thus, there are limitations to the efforts to reduce the thickness of the display device and narrow the display-area edges. In addition, since a repulsion force (or a spring-back force) of the flexible wiring substrate is generated, the display surface of the display device becomes uneven so that the planarity is lost. On top of that, in some cases, the spring-back force may break the connection between a terminal of the display device and the flexible wiring substrate.

In order to solve the problem described above, as described in Patent Document 1, there has been proposed a method in accordance with which terminals of a display panel are connected to an external-connection wiring substrate through a two-surface wiring substrate so that the external-connection wiring substrate can be accommodated in a case without bending the external-connection wiring substrate. In accordance with this method, however, even though the display-area edges can be narrowed, the use of the two-surface wiring substrate inevitably increases the thickness of the display device by a quantity corresponding to the thickness of the two-surface wiring substrate.

The present disclosure has been made in view of the above circumstances. It is desirable to provide a display device allowing a wiring substrate to be connected to a display panel without bending the wiring substrate so as to narrow the display-area edges and reduce the thickness of the display device. In addition, it is also desirable to provide electronic apparatuses each employing the display device.

According to an embodiment of the present disclosure, there is provided a display device including: a display substrate having wires on a particular one of the surfaces of the display substrate and having penetration holes each provided at a position exposed to the wire and penetrating the display substrate from the particular surface to the other display-substrate surface; and a wiring substrate provided on the side of the other surface of the display substrate and electrically connected to the wires through the penetration holes.

According to another embodiment of the present disclosure, there is provided an electronic apparatus having a display device, the display device including: a display substrate having wires on a particular one of the surfaces of the display substrate and having penetration holes each provided at a position exposed to the wire and penetrating the display substrate from the particular surface to the other display-substrate surface; and a wiring substrate provided on the side of the other surface of the display substrate and electrically connected to the wires through the penetration holes.

In the display device according to the present disclosure and the electronic apparatuses each employing the display device, the penetration holes are provided in the display substrate so that the wires provided on the particular surface of the display substrate can be electrically connected to the wiring substrate provided on the other surface side of the display substrate without bending the wiring substrate and, thus, the wires can be electrically connected to the wiring substrate by sustaining the planar shape of the wiring substrate as it is.

In accordance with the display device provided by the present disclosure and the electronic apparatuses each employing the display device, the penetration holes are provided in the display substrate so that the wires provided on the particular substrate of the display substrate can be electrically connected to the wiring substrate provided on a side close to the other surface of the display substrate by sustaining the planar shape of the wiring substrate as it is and without making use of a two-surface wiring substrate. Thus, the display-area edges of the display device can be narrowed and the thickness of the display device can be further reduced.

BRIEF DESCRIPTION OF THE DRAWINGS

FIG. 4 is a diagram showing the configuration of a portion of a cross-sectional surface taken along line IV-IV' of FIGS. 1A and 1B;

FIG. 13A is a diagram showing a front view of a sixth typical application in a state of being opened, FIG. 13B is a diagram showing a side view of the sixth typical application in the state of being opened, FIG. 13C is a diagram showing a front view of the sixth typical application in a state of being closed, FIG. 13D is a diagram showing a left-side view of the sixth typical application in the state of being closed, FIG. 13E is a diagram showing a right-side view of the sixth typical application in the state of being closed, FIG. 13F is a diagram showing a top view of the sixth typical application in the state of being closed, and FIG. 13G is a diagram showing a bottom view of the sixth typical application in the state of being closed.

DETAILED DESCRIPTION OF THE PREFERRED EMBODIMENT

Figure 1A:
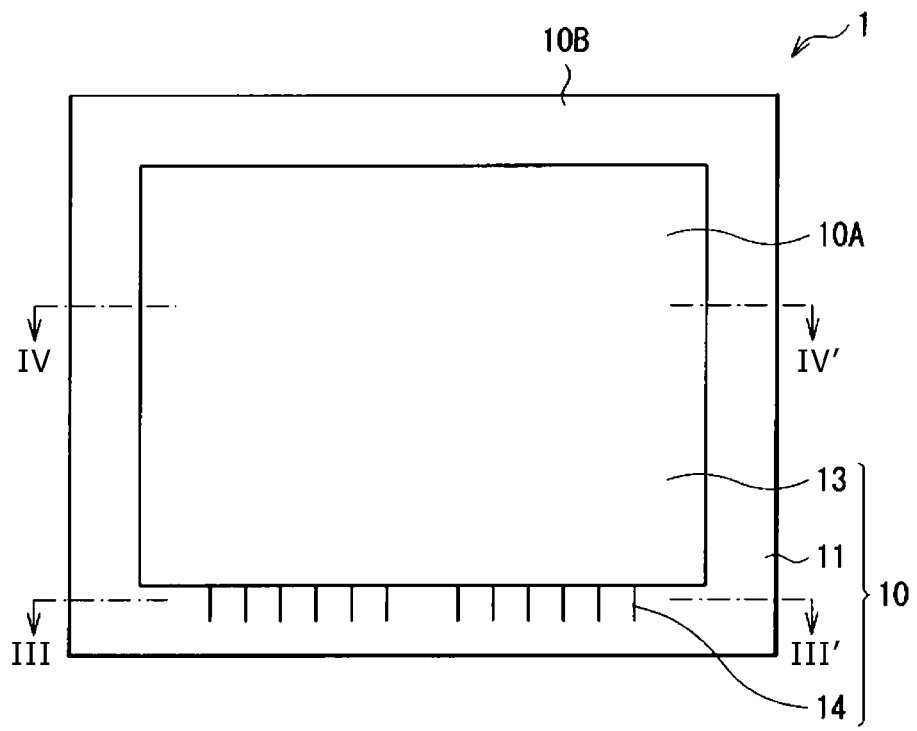
FIGS. 1A and 1B are diagrams each showing a planar configuration of a display device according to an embodiment of the present disclosure.
Figure 1B:
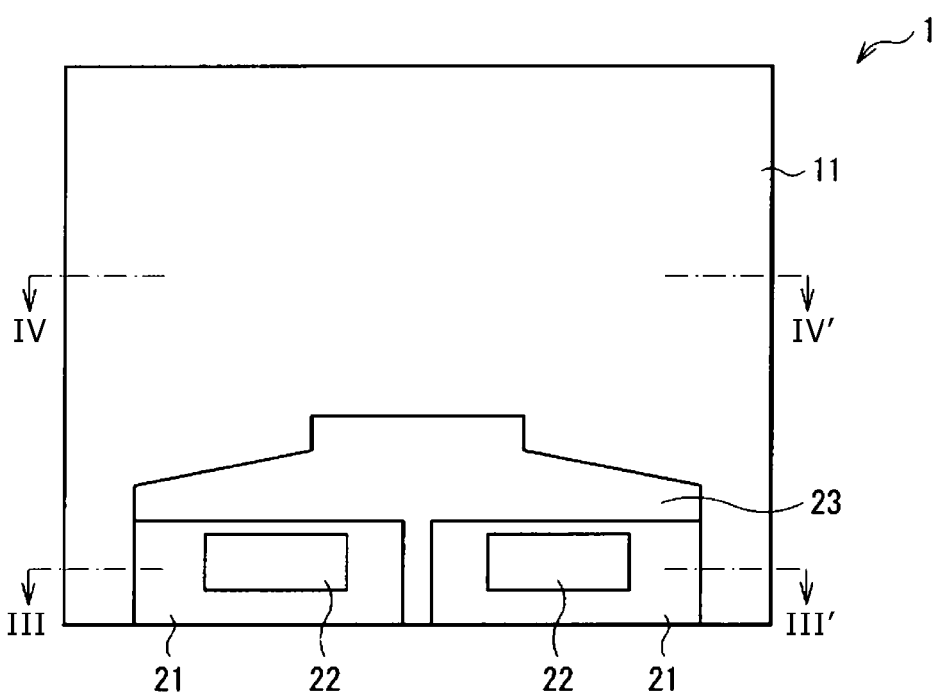

An embodiment of the present disclosure is explained below in detail by referring to the accompanying diagrams. It is to be noted that the embodiment is explained by dividing the description into the following topics.
1. Embodiment
The embodiment implements a display device having penetration holes on a display substrate.
2. Typical Applications
1. Embodiment FIGS. 1A and 1B are diagrams each showing a planar configuration of a display device 1 according to an embodiment of the present disclosure. To be more specific, FIG. 1A is a diagram showing the planar configuration seen from a position on the front side (or the display side) of the display device 1 whereas FIG. 1B is a diagram showing the planar configuration seen from a position on the rear side of the display device 1. In the display device 1, a display panel 10 is connected to a wiring substrate 21 in order to supply driving signals from a driver IC 22 to the display panel 10. The display panel 10 includes a display area 10A having a rectangular shape and a non-display area 10B surrounding the display area 10A. In actuality, the wiring substrate 21 is connected to the non-display area 10B.

Figure 2:
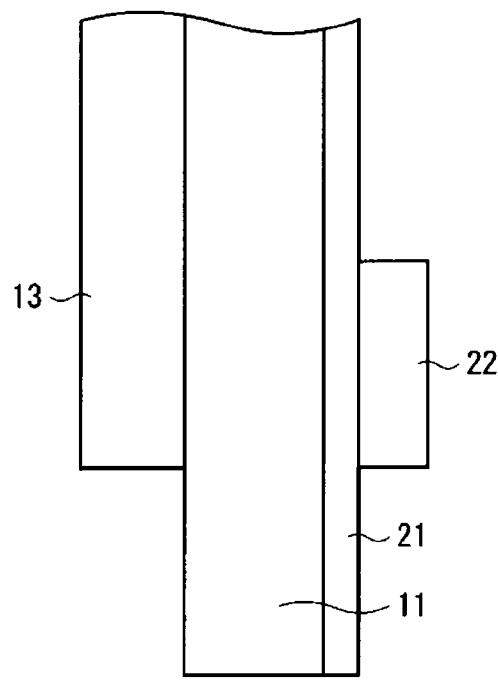
FIG. 2 is a diagram showing a side view of the configuration of a portion included in the display device shown in FIGS. 1A and 1B.
Figure 3:
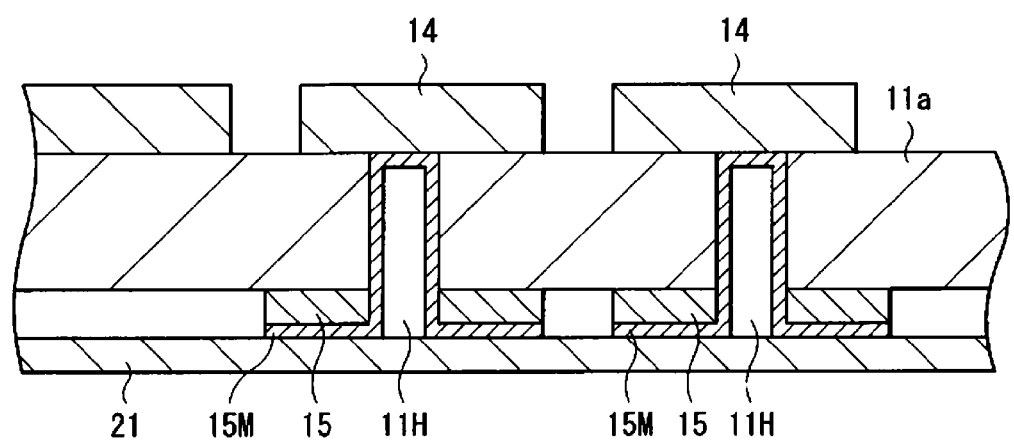
FIG. 3 is a diagram showing the configuration of a portion of a cross-sectional surface taken along line III-III' of FIGS. 1A and 1B.

FIG. 2 is a diagram mainly showing a side view of the configuration of a portion included in the non-display area 10B of the display device 1 shown in FIGS. 1A and 1B. The portion is a portion having wires 14 and the wiring substrate 21 or the lower-side portion of the configuration shown in FIG. 1B. By the same token, FIG. 3 is a cross-sectional diagram showing the configuration of the non-display area 10B whereas FIG. 4 is a diagram showing a cross-sectional configuration of the display area 10A. As shown in FIG. 4, the display panel 10 has a TFT substrate 11, a display layer 12 and a transparent substrate 13 which are arranged in this order.

The TFT substrate 11 serving as a display substrate is a substrate in which a TFT layer 11b is created on a substrate 11a. The area of the substrate 11a is greater than the area of the transparent substrate 13. In an area at the center of the surface of the substrate 11a, the TFT layer 11b, the display layer 12 and the transparent substrate 13 are created to form a stack. This area is used as the display area 10A. On the other hand, the substrate 11a also includes an area surrounding the TFT layer 11b, the display layer 12 and the transparent substrate 13. This area is used as the non-display area 10B shown in FIG. 1A. The substrate 11a is typically made from an inorganic material or a plastic material. Typical examples of the inorganic material include glass, quartz, silicon and gallium arsenic. On the other hand, typical examples of the plastic material include polyimide, PET (polyethylene terephthalate), PEN (polyethylene naphthalate), PMMA (polymethyl methacrylate), PC (polycarbonate), PES (polyethersulfone), PEEK (polyether ether ketone) and aromatic poly ester (a liquid-crystal polymer). The substrate 11a may be a rigid substrate like a wafer. That is, the substrate 11a can be a flexible substrate such as a glass thin layer or a film. If the substrate 11a is a flexible substrate, a bendable display device can be implemented.

In order to avoid deteriorations caused by moistures and organic gas as deteriorations of the TFT layer 11b and the display layer 12, a barrier layer not shown in the figures may be provided at a position between the substrate 11a and the TFT layer 11b. The barrier layer is made from typically $AlO_xN_{1-x}$ (where X is in a range of 0.01 to 0.2) or $Si_3N_4$ (silicon nitride).

The TFT layer 11b has a function of a switching device for selecting a pixel. As described above, the TFT layer 11b is provided in the display area 10A at the center of the substrate 11a. The TFT layer 11b can be an inorganic TFT making use of an inorganic semiconductor layer as a channel layer or an organic TFT making use of an organic semiconductor layer as a channel layer.

On the particular surface of the substrate 11a, a wire 14 is provided. To be more specific, the wire 14 is provided on a side of an area surrounding the display area 10A. In other words, the wire 14 is provided on a portion of the non-display area 10B. The wire 14 is electrically connected to a wire of the TFT layer 11b to play the role of supplying a driving signal propagating from the driver IC 22 through the wiring substrate 21 to pixels of the display panel 10.

As shown in FIG. 3, the substrate 11a of the embodiment has a penetration hole 11H penetrating the substrate 11a from the particular surface (or the front surface) of the substrate 11a to the other surface (or the rear surface) of the substrate 11a at a position exposed to the wire 14. The wiring substrate 21 provided on the rear-surface side of the TFT substrate 11 is electrically connected to the wire 14 on the front surface of the TFT substrate 11 through the penetration hole 11H. To put it concretely, the wiring substrate 21 is electrically connected to a terminal 15 on the rear surface of the substrate 11a by an ACF (Anisotropic Conductive Film) or the like whereas the terminal 15 is electrically connected to the wire 14 through a coating layer 15M for covering the penetration hole 11H. The terminal 15 is provided at a position corresponding to the penetration hole 11H. The coating layer 15M covers an area from the rear surface of the terminal 15 to the rear surface of the wire 14 along the penetration hole 11H. The rear surface of the terminal 15 is a surface exposed to the wiring substrate 21. The penetration hole 11H has a typical diameter in a range of 5 μm to 30 μm. In order to prevent the display layer 12 and other members from being affected by a process of connecting the terminal 15 and the wiring substrate 21 to each other, it is desirable to provide the terminal 15 (that is, the penetration hole 11H) in the non-display area 10B.

In the display device 1 according to the embodiment, a penetration hole 11H is provided in the TFT substrate 11 so that the wiring substrate 21 can be provided on the rear surface of the TFT substrate 11 without bending the wiring substrate 21. That is, the wiring substrate 21 can be provided on the rear surface of the TFT substrate 11 by sustaining the planar shape of the wiring substrate 21 as it is. Thus, the display-area edges of the display device 1 can be narrowed and the thickness of the display device 1 can be further reduced as will be described as follows.

Figure 5A:
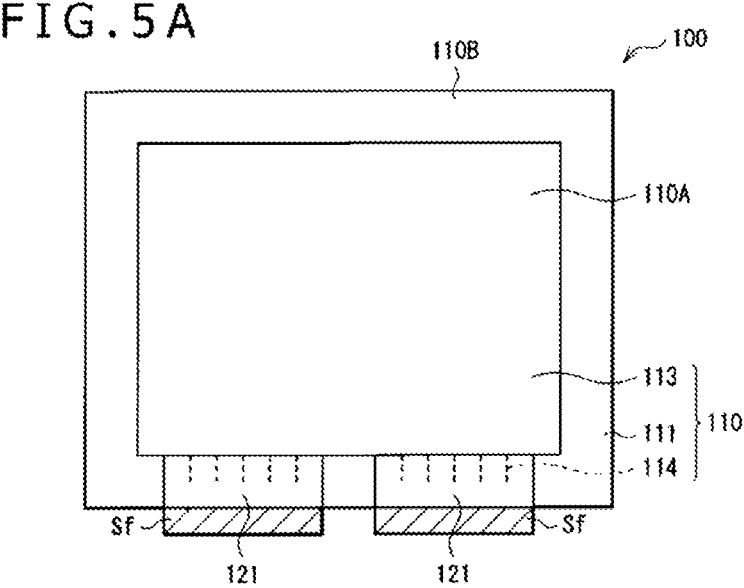
FIGS. 5A and 5B are diagrams each showing a planar configuration of the display device in the past.
Figure 5B:
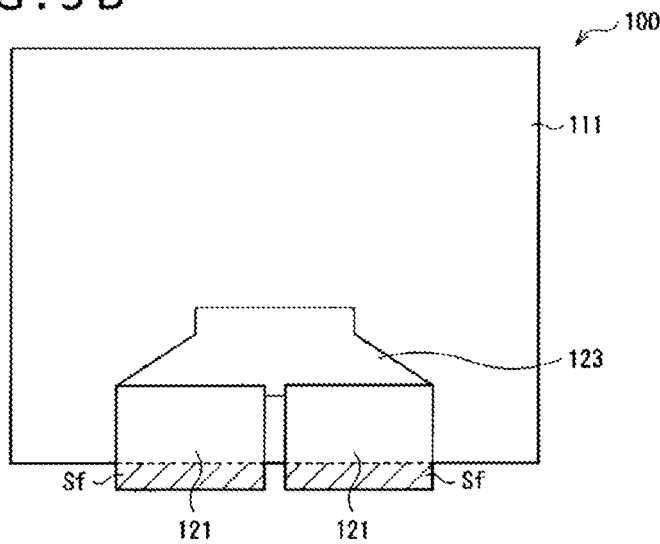
Figure 6:
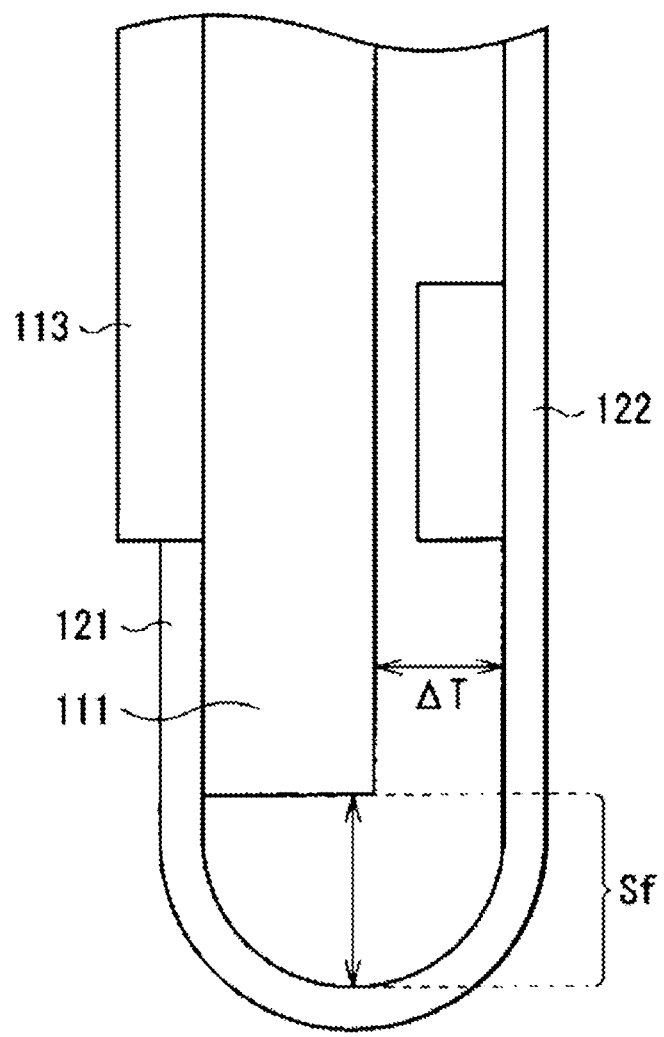
FIG. 6 is a diagram showing a side view of the configuration of a portion included in the display device in the past shown in FIGS. 5A and 5B.

FIG. 5A is a diagram showing the planar configuration of a display device 100 in the past seen from a position on the front side of the display device 100 whereas FIG. 5B is a diagram showing the planar configuration of the display device 100 seen from a position on the rear side of the display device 100. FIG. 6 is a diagram showing a side view of the configuration of a non-display area 110B included in the display device 100 shown in FIGS. 5A and 5B. It is to be noted that every reference symbol denoting a member included in the display device 100 is obtained by adding 100 to a reference symbol denoting the counterpart member included in the display device 1. Since no penetration hole 11H shown in FIG. 3 is provided in a TFT substrate 111, in order to connect a wiring substrate 121 provided on the rear-surface side of the TFT substrate 111 to a wire 114 provided on the front surface of the TFT substrate 111, it is necessary to provide the wiring substrate 121 with a configuration in which the wiring substrate 121 is bent by 180 degrees around the end surface of the TFT substrate 111 as shown in FIG. 6. If the wiring substrate 121 is bent, however, a curvature distance (or a curvature-radius distance) is required. Thus, in order to connect the wiring substrate 121 to a display panel 110, the size of a display-area edge is increased by an area Sf and the thickness of the display device 100 is increased by ΔT.

In addition, since a repulsion force (or a spring-back force) of the wiring substrate 121 is generated when the wiring substrate 121 is bent, a connection between the wiring substrate 121 and the wire 114 is broken so that reliability is lost in some cases. On top of that, it is also feared that the spring-back force makes the display surface of the display panel 110 in the planar shape uneven so that the original design is lost.

In order to solve the problems raised by the display device 100 in the past as described above, as disclosed in Japanese Patent Laid-open No. 2009-115686, there has been proposed a method in accordance with which a two-surface wiring substrate is provided at a location between a TFT substrate and a wiring substrate so that the wiring substrate can be connected to a wire of the TFT substrate by sustaining the planar shape of the wiring substrate as it is. In accordance with this method, however, even though the size of the display-area edges can be reduced in comparison with that of the display device 100 in the past, the use of the two-surface wiring substrate inevitably increases the thickness of the display device by a quantity corresponding to the thickness of the two-surface wiring substrate. In addition, even though the TFT substrate is a flexible substrate for example, the existence of the two-surface wiring substrate reduces the flexibility of the display device as a whole.

On the other hand, a penetration hole 11H is provided in the TFT substrate 11 of the embodiment so that the wiring substrate 21 provided on the rear-surface side of the TFT substrate 11 can be connected to a wire 14 on the front surface of the TFT substrate 11 through the penetration hole 11H without bending the wiring substrate 21. That is, the wiring substrate 21 can be connected to the wire 14 by sustaining the planar shape of the wiring substrate 21 as it is. That is, the curvature distance of the wiring substrate 21 is not required and the two-surface wiring substrate is not used.

Thus, even if the wiring substrate 21 is connected to the display panel 10 as shown in FIG. 2, the size of the display-area edges does not increase and the thickness of the display device 1 is increased only by a quantity corresponding to the thickness of the wiring substrate 21. That is, in the case of the display device 1 according to the embodiment, the display-area edges of the display device 1 can be narrowed and the thickness of the display device 1 can be reduced in comparison with those of the display device 100 in the past.

In addition, since the wiring substrate 21 is accommodated in a case by sustaining the planar shape of the wiring substrate 21 as it is, the problems caused by the spring-back force as described above are not raised. On top of that, it is not feared that the reliability of the connection between the wiring substrate 21 and the wire 14 as well as the original design of the display panel 10 are lost. In addition, by creating the substrate 11a from a flexible material, the display device 1 can be implemented as a bendable display device.

On top of that, since the wiring substrate 21 can be connected to the wire 14 without being bent, the wiring substrate 21 can be provided without protruding from the circumference of the display panel 10 as shown in FIG. 1. Thus, the periphery of the display panel 10 can be used for the purpose of fixing the display panel 10 on a case and/or the purpose of positioning the display panel 10 on the case. As a result, the degree of design freedom can be raised.

The display layer 12 on the TFT substrate 11 has an electrophoretic migration display unit between a pixel electrode and a common electrode. That is, the display device 1 is an electrophoretic migration display device for displaying an image such as character information by making use of an electrophoretic migration phenomenon. In other words, the display device 1 is the so-called electronic paper display device. The pixel electrode is provided in a state of being brought into contact with the TFT layer 11b for every pixel. On the other hand, the common electrode is provided over the entire surface of the transparent substrate 13.

The transparent substrate 13 can be made from the same material as the substrate 11a. A humidity preventing film and an optical-system functioning film can be provided on the transparent substrate 13. The humidity preventing film is a film for preventing moistures from intruding into the display layer 12 whereas the optical-system functioning film is a film for preventing external light from being reflected on the display screen.

As described above, the wiring substrate 21 is provided so as to face the rear surface of the substrate 11a and connected to the display panel 10 (or the terminal 15). The wiring substrate 21 is typically a flexible wiring substrate which is constructed by creating a Cu (copper) foil or the like as a wiring pattern on the rear surface of a flexible film base material. On the flexible film base material, a driver IC 22 is mounted to form a COF (Chip on Film). It is possible to provide a configuration in which a relay substrate 23 is connected to the wiring substrate 21 in order to supply signals coming from sources other than the driver IC 22 to the wiring substrate 21.

The display device 1 can typically be manufactured by adoption the following manufacturing method.

Figure 7A:
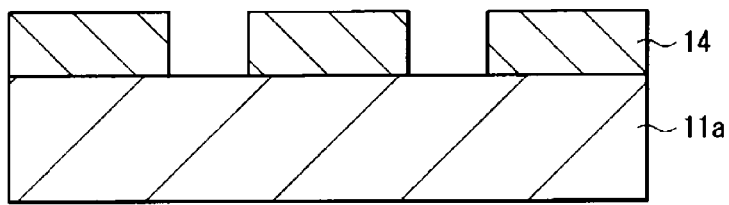
FIGS. 7A to 7H are diagrams showing cross sections to be referred to in description of a process sequence of a method for manufacturing the display device shown in FIGS. 1A and 1B.

First of all, the TFT layer 11b described above is provided on the display area 10A of the front surface of the substrate 11a to form the TFT substrate 11. Then, at the same time as wires of the TFT layer 11b, as shown in FIG. 7A, wires 14 are created from typically Mo (molybdenum)-Al (aluminum)-Mo (molybdenum) on the non-display area 10B.

Figure 7B:
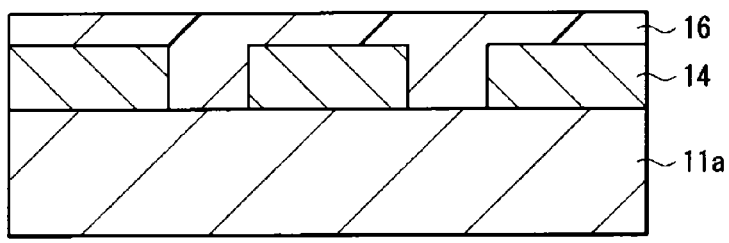
Figure 7C:
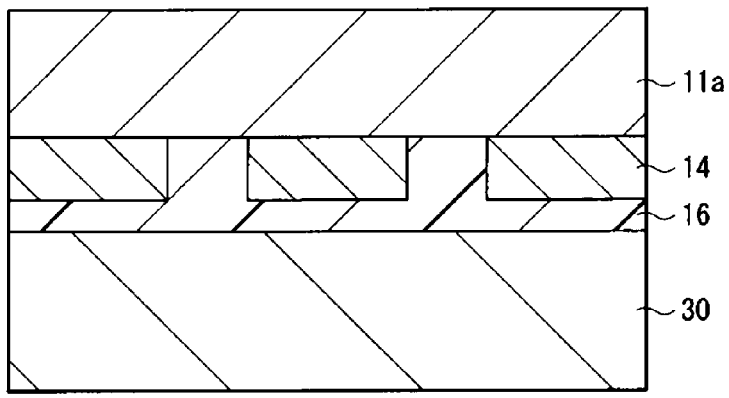

Subsequently, as shown in FIG. 7B, after the wires of the TFT layer 11b and the wires 14 have been protected (or masked) by making use of a resist layer 16, the TFT substrate 11 is fixed on a transport substrate 30 so that the resist layer 16 is brought into contact with the transport substrate 30 as shown in FIG. 7C. The transport substrate 30 plays the role to protect the wires of the TFT layer 11b and the wires 14 in a process of creating a terminal 15 to be described later.

Figure 7D:
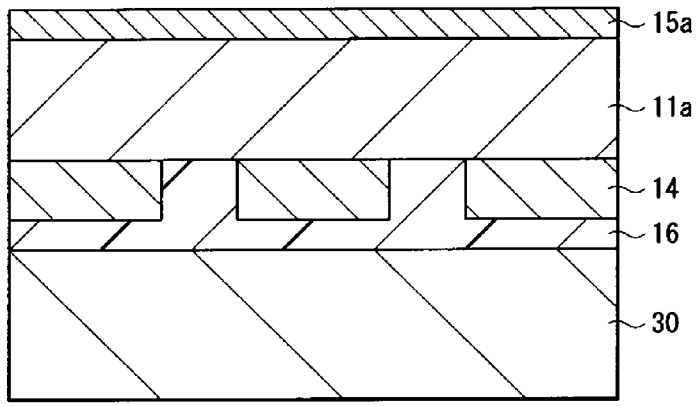
Figure 7E:
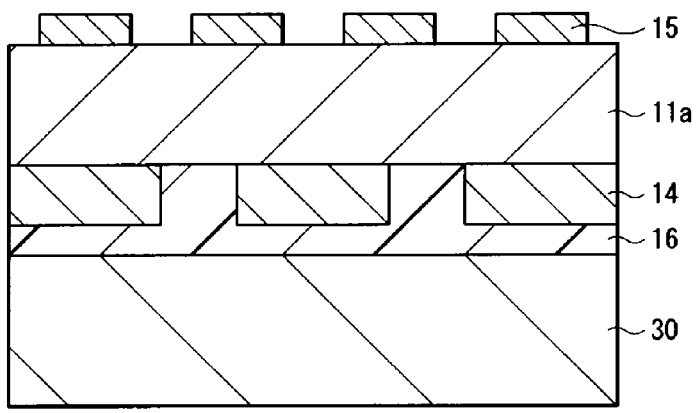

After the TFT substrate 11 has been fixed on the transport substrate 30, as shown in FIG. 7D, on the rear surface of the TFT substrate 11, a metallic film 15a is created from typically Mo—Al—Mo by making use of a sputtering apparatus, an evaporation apparatus or the like. Then, as shown in FIG. 7E, after the metallic film 15a has been subjected to a patterning process making use of typically photo-resist in order to create a pattern at positions each corresponding to one of the wires 14, the metallic film 15a is subjected to an etching process in order to create terminals 15.

Figure 7F:
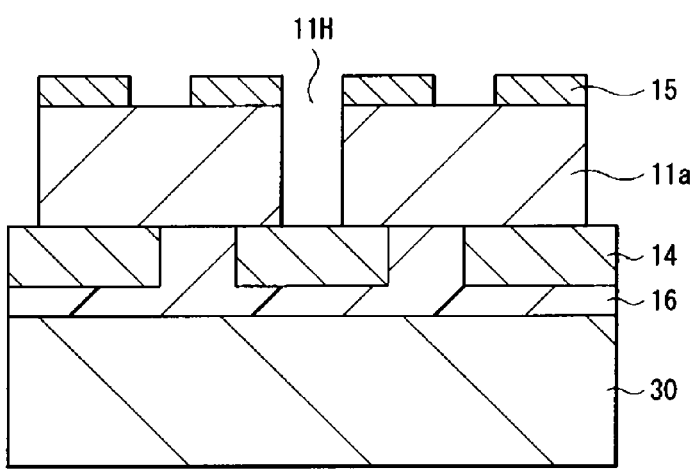

After the terminals 15 have been created, as shown in FIG. 7F, a penetration hole 11H according to the embodiment is created by making use of a laser beam or the like. The penetration hole 11H is extended through the TFT substrate 11 from the rear surface of the TFT substrate 11 to the front surface of the TFT substrate 11 and created so as to face the position of a wire 14. At that time, if the substrate 11a is a flexible substrate made from PI (polyimide) or the like for example, the penetration hole 11H can be created with ease or with a high degree of precision in comparison with a material such as glass used as a material from which the substrate 11a is made.

Figure 7G:
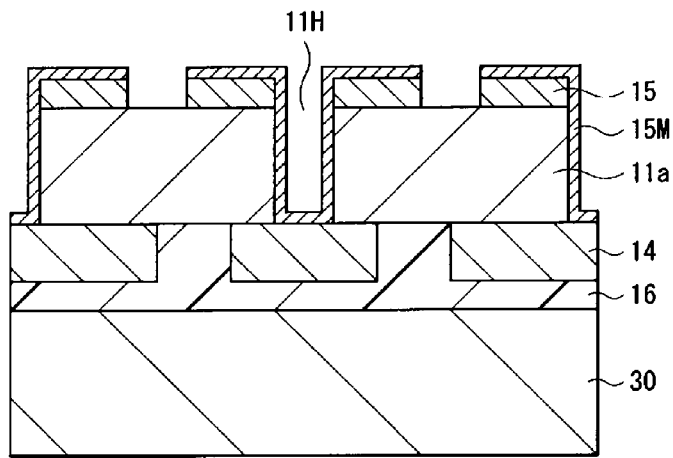
Figure 7H:
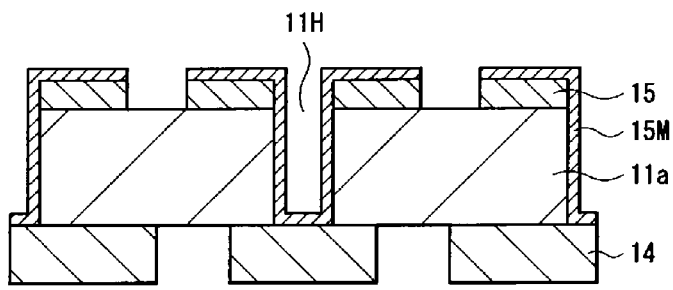

Then, as shown in FIG. 7G, after the rear surface of the terminal 15 and the penetration hole 11H have been subjected to a coating process making use of Au (gold), Cu (copper) or another material in order to create a coating layer 15M, the TFT substrate 11 and the resist layer 16 are peeled off from the transport substrate 30 and the resist layer 16 is removed from the TFT substrate 11 as shown in FIG. 7H.

After the resist layer 16 has been removed from the TFT substrate 11, a pixel electrode and a display unit are created on the front surface of the TFT substrate 11. Then, on the TFT substrate 11 including the created display unit, a transparent substrate 13 provided with a common electrode, a humidity preventing film and an optical-system functioning film is pasted in order to create a display panel 10. As an alternative, the humidity preventing film and the optical-system functioning film can also be created on the transparent substrate 13 after the transparent substrate 13 including a common electrode created thereon and the TFT substrate 11 have been pasted on each other.

As described above, after the display panel 10 has been created, the wiring substrate 21 on which the driver IC 22 has been mounted is electrically connected to the terminal 15 by making use of an ACF in a thermal compression bonding process in order to complete the process of creating the display device 1.

In the display device 1 according to the embodiment, the penetration hole 11H is provided in the TFT substrate 11 so that the wiring substrate 21 provided on the rear-surface side of the TFT substrate 11 can be electrically connected to the wire 14 on the front surface of the TFT substrate 11 without being bent. That is, the wiring substrate 21 can be electrically connected to the wire 14 by sustaining the planar shape of the wiring substrate 21 as it is. The wiring substrate 21 receives a driving signal from the driver IC 22 mounted on the wiring substrate 21 in order to display an image on the side close to the transparent substrate 13 on the display panel 10 while carrying out a modulation process for each pixel.

As described above, in the display device 1 according to the embodiment, the penetration hole 11H is provided in the TFT substrate 11 so that the wiring substrate 21 provided on the rear-surface side of the TFT substrate 11 can be electrically connected to the wire 14 on the front surface of the TFT substrate 11 by sustaining the planar shape of the wiring substrate 21 as it is and without making use of the two-surface wiring substrate. Thus, it is possible to narrow the display-area edges of the display device 1 and decrease the thickness of the display device 1.

In addition, the terminal 15 to be connected to the wiring substrate 21 is provided in the non-display area 10B of the TFT substrate 11 so that it is possible to reduce a bad effect of a process to connect the wiring substrate 21 to the terminal 15 on the display quality and the like.

In addition, if the substrate 11a is a flexible substrate, the penetration hole 11H can be created with ease and with a high degree of precision. On top of that, the display device 1 itself can be bent.

2. Typical Applications

The display device 1 described above can be mounted on typically electronic apparatuses which are described as first to sixth typical applications as follows.

<First Typical Application>

Figure 8A:
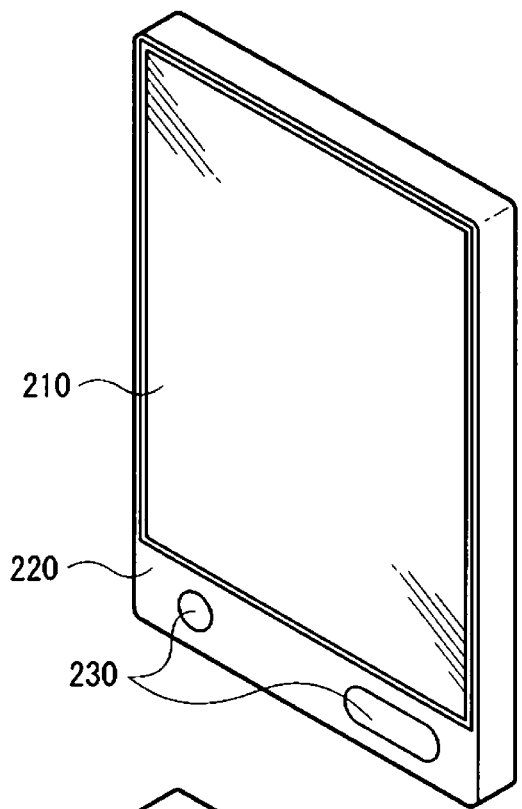
FIGS. 8A and 8B are diagrams each showing a perspective view of an external appearance of a first typical application.
Figure 8B:
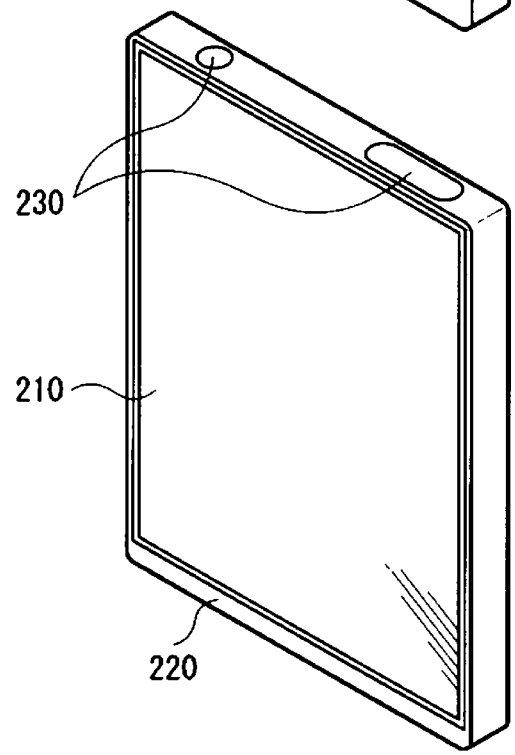

FIGS. 8A and 8B are diagrams each showing an external appearance of an electronic book. The electronic book has typically a display section 210 implemented by the display device 1, a non-display section 220 and an operation section 230. As shown in FIG. 8A, the operation section 230 can be created on the same surface as the front surface of the display section 210. As an alternative, as shown in FIG. 8B, the operation section 230 can also be created on the upper surface which is different from the front surface of the display section 210.

<Second Typical Application>

Figure 9:
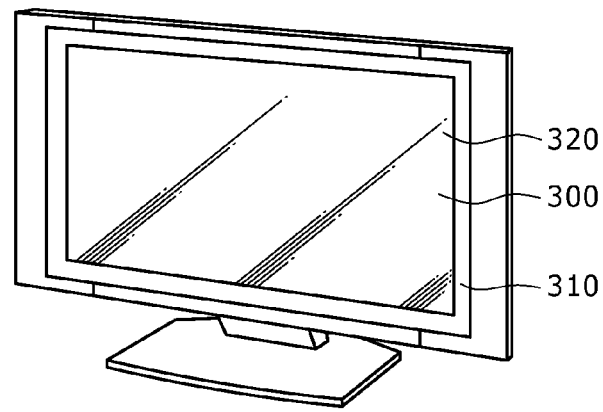
FIG. 9 is a diagram showing a perspective view of an external appearance of a second typical application.

FIG. 9 is a diagram showing an external appearance of a TV set. The TV set has typically a video display screen section 300 implemented by the display device 1. The video display screen section 300 includes a front panel 310 and a filter glass 320.

<Third Typical Application>

Figure 10A:
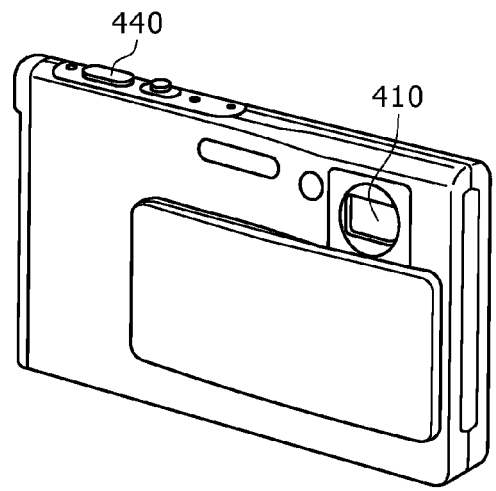
FIG. 10A is a diagram showing a perspective view of an external appearance seen from a position on the front side of a third typical application as an external appearance of the third typical application.
Figure 10B:
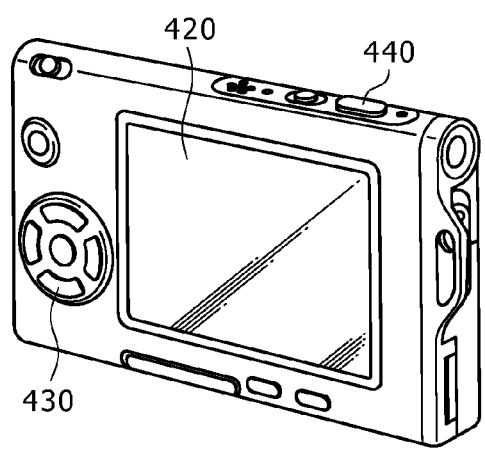
FIG. 10B is a diagram showing a perspective view of an external appearance seen from a position on the rear side of the third typical application as the external appearance of the third typical application.

FIGS. 10A and 10B are diagrams each showing an external appearance of a digital still camera. The digital still camera has typically a light emitting section 410 used as a flash, a display section 420 implemented by the display device 1, a menu switch 430 and a shutter button 440.

<Fourth Typical Application>

Figure 11:
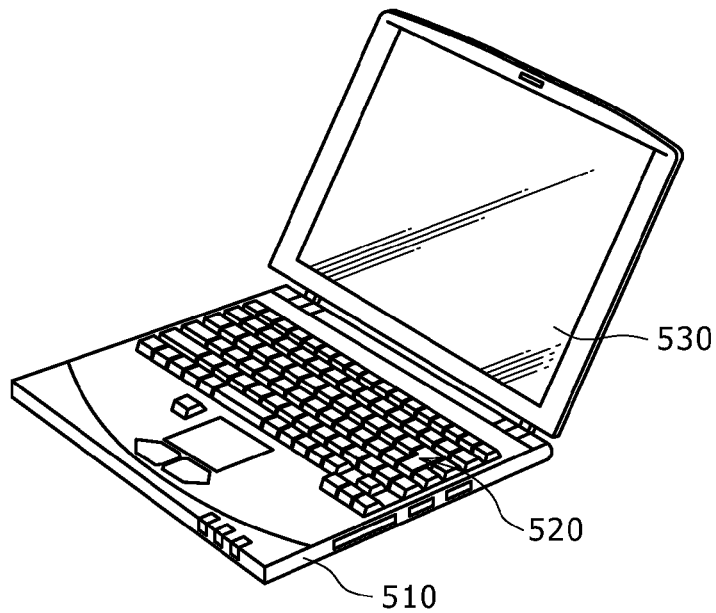
FIG. 11 is a diagram showing a perspective view of an external appearance of a fourth typical application.

FIG. 11 is a diagram showing an external appearance of a notebook personal computer. The notebook personal computer has typically a main unit 510, a keyboard 520 to be operated by the user in order to enter an input such as a character and a display section 530 implemented by the display device 1 for displaying an image.

<Fifth Typical Application>

Figure 12:
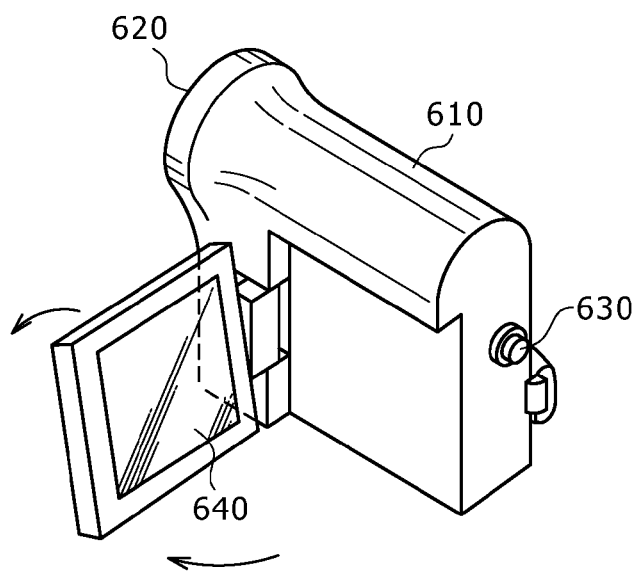
FIG. 12 is a diagram showing a perspective view of an external appearance of a fifth typical application.

FIG. 12 is a diagram showing an external appearance of a video camera. The video camera has typically a main unit 610, a lens 620, a start/stop switch 630 and a display section 640 implemented by the display device 1. The lens 620 is provided on a surface on the front side of the main unit 610 and used for photographing an object. The start/stop switch 630 is operated by the user to start or stop a photographing operation.

<Sixth Typical Application>

FIGS. 13A to 13G are diagrams each showing an external appearance of a hand phone. The hand phone has typically an upper-side case 710, a lower-side case 720, a hinge section 730, a display section 740 implemented by the display device 1, a sub-display section 750 also implemented by the display device 1, a picture light 760 and a camera 770. The hinge section 730 is a section for linking the upper-side case 710 and the lower-side case 720 to each other.

The present disclosure has been exemplified by taking an embodiment and modified versions as examples. However, implementations of the present disclosure are not limited to the embodiment and the modified versions. That is, a variety of changes can be made to the embodiment and the modified versions. For example, in the embodiment described above, the display layer 12 is implemented as an electrophoretic migration display unit. However, the display layer 12 can also be implemented as a liquid-crystal display unit, an organic EL (Electroluminescence) display unit or an inorganic EL display unit.

In addition, in the configuration described before by referring to FIG. 3, the radius of the penetration hole 11H on the front-surface side is made equal to the radius of the penetration hole 11H on the rear-surface side. However, the radius of the penetration hole 11H on the front-surface side may also be made different from the radius of the penetration hole 11H on the rear-surface side. On top of that, the radius can be uniform for all penetration holes 11H or may vary from penetration hole 11H to penetration hole 11H.

In addition, in the embodiment described above, no particular limitations are imposed on a variety of attributes for a variety of layers. That is, the attributes may be changed. The attributes of a layer include the material used for making the layer, the thickness of the layer, the method for creating the layer and the conditions for creating the layer.

On top of that, in the embodiment described above, the driver IC 22 is mounted on the wiring substrate 21. However, the driver IC 22 can also be provided separately.

In addition, in the embodiment described above, the present disclosure is exemplified by giving the configuration of the display device 1 as a concrete example. However, it is not necessary to provide all the layers of the configuration of the display device 1. On top of that, another layer may also be added to the configuration of the display device 1.

It is to be noted that the present disclosure can also be configured into implementations 1 to 6 described as follows.

(1) A display device including: a display substrate having wires on a particular one of the surfaces of the display substrate and having penetration holes each provided at a position exposed to the wire and penetrating the display substrate from the particular surface to the other display-substrate surface; and a wiring substrate provided on the side of the other surface of the display substrate and electrically connected to the wires through the penetration holes.

(2) The display device according to (1), further including terminals provided on the other surface of the display substrate, and each electrically connected to one of the wires through one of the penetration holes, wherein the terminals electrically connect the wiring substrate to the wires.

(3) The display device according to (2), wherein the terminals and the wiring substrate are connected to each other by an anisotropic conductive film.

(4) The display device according to (1) to (3), wherein: the display substrate has a display area and a non-display area; and the penetration holes are provided in the non-display area.

(5) The display device according to (1) to (4), wherein the display substrate is a flexible substrate.

(6) An electronic apparatus including a display device, the display device including: a display substrate having wires on a particular one of the surfaces of the display substrate and having penetration holes each provided at a position exposed to the wire and penetrating the display substrate from the particular surface to the other display-substrate surface; and a wiring substrate provided on the side of the other surface of the display substrate and electrically connected to the wires through the penetration holes.

The present disclosure contains subject matter related to that disclosed in Japanese Priority Patent Application JP 2011-084730 filed in the Japan Patent Office on Apr. 6, 2011, the entire content of which is hereby incorporated by reference.

What is claimed is:

1. A display device, comprising:
a display substrate including a thin film transistor (TFT) layer configured as a switching device to select one or more pixels for display,
wherein the display substrate has a display area and a non-display area which surrounds the display area,
wherein the display substrate is made up of a plastic material, and
wherein the plastic material is polyether ether ketone;
a plurality of wires on a first surface of the display substrate;
a wiring substrate and a plurality of terminals on a second surface of the display substrate;
a plurality of penetration holes configured to penetrate the display substrate from the first surface to the second surface,
wherein the plurality of penetration holes are located in the non-display area, and
wherein each penetration hole of the plurality of penetration holes corresponds to a wire of the plurality of wires; and
a plurality of coating layers that electrically connect the plurality of wires to the wiring substrate,
wherein each coating layer of the plurality of coating layers corresponds to a penetration hole of the plurality of penetration holes,
wherein each coating layer extends from a surface of one of the plurality of terminals to the first surface of the display substrate, and
wherein the surface is exposed towards the wiring substrate.

2. The display device according to claim 1, wherein each terminal of the plurality of terminals is electrically connected through the penetration hole via the corresponding coating layer.

3. The display device according to claim 2, further comprising an anisotropic conductive film configured to connect at least one terminal of the plurality of terminals to the wiring substrate.

4. The display device according to claim 1, wherein the display substrate is a flexible substrate.

5. An electronic apparatus including a display device, the display device comprising:
a display substrate, wherein the display substrate includes a thin film transistor (TFT) layer configured as a switching device to select one or more pixels for display,
wherein the display substrate has a display area and a non-display area which surrounds the display area,
wherein the display substrate is made up of a plastic material, and
wherein the plastic material is polyether ether ketone;

a plurality of wires on a first surface of the display substrate;

a wiring substrate and a plurality of terminals on a second surface of the display substrate;

a plurality of penetration holes configured to penetrate the display substrate from the first surface to the second surface, wherein the plurality of penetration holes are located in the non-display area, and wherein each penetration hole of the plurality of penetration holes corresponds to a wire of the plurality of wires; and a plurality of coating layers that electrically connect the plurality of wires to the wiring substrate, wherein each coating layer of the plurality of coating layers corresponds to a penetration hole of the plurality of penetration holes, wherein each coating layer extends from a surface of one of the plurality of terminals to the first surface of the display substrate, and wherein the surface is exposed towards the wiring substrate.

6. The display device according to claim 1, wherein the penetration hole has a diameter in a range of 5 μm to 30 μm.

7. The electronic apparatus according to claim 5, wherein each terminal of the plurality of terminals is electrically connected through the penetration hole via the corresponding coating layer.

8. The electronic apparatus according to claim 7, further comprising an anisotropic conductive film configured to connect at least one terminal of the plurality of terminals to the wiring substrate.

9. The electronic apparatus according to claim 5, wherein the display substrate is a flexible substrate.

10. The electronic apparatus according to claim 5, wherein the penetration hole has a diameter in a range of 5 μm to 30 μm.

11. The display device according to claim 1, wherein, for each penetration hole of the plurality of penetration holes, a first radius of the penetration hole proximal to the first surface is different from a second radius of the penetration hole proximal to the second surface.

12. The display device according to claim 1, wherein a first radius of a first penetration hole of the plurality of penetration holes is different from a second radius of a second penetration hole of the plurality of penetration holes.

13. The display device according to claim 1, wherein a barrier layer is at a position between the display substrate and the thin film transistor (TFT) layer, and wherein the barrier layer is made of silicon nitride.

* * * * *